(12) United States Patent
Hurlburt et al.

(10) Patent No.: US 6,972,301 B2
(45) Date of Patent: Dec. 6, 2005

(54) PROCESS FOR PRODUCING ORGANICALLY MODIFIED METAL OXIDES AND PRODUCTS THEREOF

(75) Inventors: Paul K. Hurlburt, Leander, TX (US); Jeff T. Fenton, Katy, TX (US)

(73) Assignee: Sasol North America Inc., Houston, TX (US)

( * ) Notice: Subject to any disclaimer, the term of this patent is extended or adjusted under 35 U.S.C. 154(b) by 0 days.

(21) Appl. No.: 10/166,923

(22) Filed: Jun. 6, 2002

(65) Prior Publication Data

US 2003/0229151 A1 Dec. 11, 2003

(51) Int. Cl.⁷ .............................. B01F 17/00; B01F 3/12; C09K 3/00
(52) U.S. Cl. ................. 516/78; 510/100; 427/219; 428/405
(58) Field of Search ............... 516/78, 100; 427/219; 428/405

(56) References Cited

U.S. PATENT DOCUMENTS

| | | | | |
|---|---|---|---|---|
| 4,061,503 A | * | 12/1977 | Berger et al. | 106/445 |
| 4,062,693 A | * | 12/1977 | Berger | |
| 4,316,807 A | * | 2/1982 | McDaniel et al. | 516/100 X |
| 4,731,264 A | | 3/1988 | Lin et al. | 427/387 |
| 5,057,151 A | * | 10/1991 | Schuster et al. | 427/219 X |
| 5,565,142 A | | 10/1996 | Deshpande et al. | |
| 5,919,298 A | * | 7/1999 | Griffith et al. | 423/336 |
| 6,107,351 A | * | 8/2000 | Burns et al. | 516/100 |
| 6,214,106 B1 | * | 4/2001 | Weber et al. | 106/442 |
| 6,224,846 B1 | * | 5/2001 | Hurlburt et al. | 516/100 X |
| 6,344,240 B1 | * | 2/2002 | Menon et al. | 516/100 X |
| 6,500,534 B1 | * | 12/2002 | Dittfurth et al. | 516/100 X |

FOREIGN PATENT DOCUMENTS

EP  0 741 045 A1  11/1996

* cited by examiner

*Primary Examiner*—Daniel S. Metzmaier
(74) *Attorney, Agent, or Firm*—Browning Bushman P.C.; C. James Bushman

(57) ABSTRACT

A process of producing an organically modified metal oxide wherein an aqueous slurry of a metal oxide which can be peptized in the presence of an acid is admixed with an aqueous slurry of an oregano silage having the formula $R_y SiX_{4-y}$, the mixture of the aqueous slurry and the oregano silage being thermally aged to produce a colloidal metal oxide sol which can be dried to produce a powder which is readily discernible in polar compounds such as alcohols, water and the like.

14 Claims, No Drawings

PROCESS FOR PRODUCING ORGANICALLY MODIFIED METAL OXIDES AND PRODUCTS THEREOF

BACKGROUND OF THE INVENTION

1. Field of the Invention

The present invention relates to a one-pot process for producing organically modified metal oxides and products produced thereby.

2. Description of the Prior Art

It is known to hydrothermally treat metal oxides such as boehmite alumina to convert the boehmite into a boehmite sol which is readily dispersible in water. For example, in U.S. Pat. No. 4,676,928, it is taught to form a colloidal sol of boehmite alumina by hydrothermally aging the boehmite alumina in the presence of an acid. However, to convert the dispersible boehmite into an organically modified alumina and, more specifically, an organic silane derivative, it is then necessary to treat the dispersible alumina with a siloxane substituted with one or more alkoxy groups. Over and above the fact that this reaction involves two steps, i.e., hydrothermal treatment of the boehmite alumina followed by treating the aged boehmite alumina with a siloxane, the latter reaction leads to by-product alcohols since the reaction must be carried out in alcohols or other non-aqueous solvents.

SUMMARY OF THE INVENTION

According to a preferred aspect of the present invention, there is provided a one-step process for producing an organically modified metal oxide. In the preferred embodiment, an aqueous slurry of a metal oxide is formed, the metal oxide being of a type that is susceptible to peptization in the presence of an acid. The aqueous slurry is admixed with an organo silane having the formula $R_y SiX_{4-y}$ wherein R is an organic moiety, x is a moiety which produces an acid anion in the presence of water and y is from 1–3 provided that when y is 2 or 3, R can be 2 or 3 of the same organic moiety or 2 or 3 different organic moieties. The mixture of the aqueous slurry and the organo silane is thermally aged to produce a dispersed, colloidal metal oxide sol which can be dried to produce a dispersible organically modified metal oxide powder.

DESCRIPTION OF THE ILLUSTRATED EMBODIMENTS

In accordance with the invention, inorganic metal oxides having the general formula MaOb which are susceptible to peptization in the presence of an acid, can be employed. Non-limiting examples of suitable metal oxides include aluminas, particularly boehmite alumina. It will be understood that the term metal oxide includes metal oxides as well as their hydrates, boehmite alumina being an example of such a metal oxide hydrate. The metal oxide is formed into an aqueous slurry, the metal oxide being present in the slurry in an amount of from about 1 to about 40 percent by weight, preferably from about 5 to about 20 percent by weight, calculated as the oxide.

The organo silanes useful in the process of the present invention are those having the formula $R_y SiX_{4-y}$ wherein R is an organic moiety, X is a moiety which produces an acid anion in the presence of water and y is from 1 to 3, provided that where y is 2 or 3, R can be 2 or 3 of the same organic moiety or 2 or 3 different organic moieties. Thus, R can be an alkyl group, an alkenyl group, a cyclic group, an aryl group or any number of organic moieties from which silanes can be formed. Non-limiting examples of the R grouping include alkyl radicals having from 1 to 24 carbon atoms, alkenyl radicals having from 1 to 24 carbon atoms, aryl radicals having from 6 to 18 carbon atoms, cyclic hydrocarbyl groups having from 5 to 18 carbon atoms, etc. It will also be appreciated that the R group need not be a pure hydrocarbon but can, itself be substituted with other groups provided such other groups do not interfere with the reaction. The X group, which is a moiety that produces an acid anion in the presence of water can include inorganic ions such as chloride or bromide. Alternatively, X can be an organic grouping such as a carboxyl group, sulfonate group, perfluoro alkyl sulfonate alkyl phosphate or the like. Non-limiting examples of suitable organo silanes include trimethylchlorosilane, triethylchlorosilane, pentafluorophenylchlorosilane, trimethylsilylacetate, chlorodimethylphenylsilane, tributyl silyl trifluoromethane sulfonate, etc.

According to one aspect of the process of the present invention, the metal oxide, e.g., boehmite alumina, is formed into an aqueous slurry and admixed with an organo silane as described above. Generally speaking the amount of the organo silane employed will be such that the weight ratio of metal oxide, calculated as oxide, to the organo silane, will be from about 1:2 to about 100:1.

In performing the process of the present invention and according to a preferred embodiment, the mixture of the aqueous slurry and the organo silane is subjected to hydrothermal treatment at a temperature and for a time sufficient to produce an organically modified, dispersed colloidal metal oxide sol. Generally speaking, the hydrothermal treatment or aging is conducted at temperatures ranging from 70 to 200° C. for a period of time of from 0.25 to 8 hours.

The colloidal eottoidial sol produced can be used as is in certain end uses. Alternatively, the colloidal sal can be dried, e.g., by spray drying, to produce a powder which is readily dispersible in liquids such as water, lower alcohols, (alcohols containing from 1 to 18 carbon atoms), lower glycols (glycols containing from 2 to 18 carbon atoms), water-alcohol mixtures, water-glycol mixtures, and indeed in virtually any polar solvent, be it organic or inorganic. To further illustrate the present invention, the following non-limiting examples are presented.

EXAMPLE 1

1.29 $(CH_3)_3SiCl$ was added to 315 g boehmite alumina slurry (12% boehmite alumina by weight) and aged 1.5 hours at 175° C. to produce a well dispersed colloidal boehmite sol. The powder obtained by drying the sol was easily dispersed in absolute methanol.

EXAMPLE 2

The procedure of Example 1 was followed except 1.7 g of $(CH_3)_3SiCl$ was employed. The well dispersed colloidal boehmite sol that was produced could be dried to a powder that was easily dispersible in absolute methanol.

EXAMPLE 3

The example of Example 1 was followed except 1.0 g of pentafluorophenylchlorosilane was added to 110 grams of the boehmite alumina slurry (12% boehmite by weight). A well dispersed colloidal boehmite sol was produced which could be dried to a readily dispersible powder.

EXAMPLE 4

The procedure of Example 1 was followed with the exception that 1.45 g trimethylsilylacetate was added to 315 g boehmite slurry (12% boehmite by weight). A well dispersed colloidal boehmite sol was obtained. The sol could be dried to a powder which was readily dispersible in absolute methanol.

EXAMPLE 5

The procedure of Example 4 was followed with the exception that at one 1.88 g of chiorodimethyiphenylsilane was employed. A well dispersed colloidal boehmite sol was obtained which could be dried into a powder which was readily dispersible in absolute methanol.

As can be seen from the above examples, the present invention provides a one-step/one-pot process wherein a metal oxide such as boehmite alumina can be converted to an organically modified, dispersed colloidal sol which in turn can be dried to produce a powder readily dispersible in polar compounds such as alcohols, water, etc. As can also be seen, the process produces no by-products since all of the constituents form part of the final product. Thus, in the case where chloride is the X group, the chloride becomes bound to the boehmite alumina. Likewise the same is true for the acetate groups. Indeed, when the organically modified colloidal sol is subjected to drying, e.g., by spray drying, only water is released leaving a powder containing all of the constituents originally present in the metal oxide and the oregano silane.

What is claimed is:

1. A process for treating a metal oxide comprising:
   forming an aqueous slurry of a metal oxide, said slurry containing from 1 to 40% by wt. metal oxide, said metal oxide being susceptible to peptization in the presence of an acid;
   mixing with said aqueous slurry an organo silane having the formula $R_y SiX_{4-y}$, wherein R is an organic moiety, X is an organic grouping which produces an acid anion in the presence of water and y is from 1 to 3 and provided that where y is 2 or 3, R can be 2 or 3 of the same organic moiety or 2 or 3 different organic moieties; and
   subjecting the mixture of said aqueous slurry and said organo silane to hydrothermal aging to produce an organically modified colloidal metal oxide sol.

2. The process of claim 1, further comprising drying said sol to produce a dispersible powder.

3. The process of claim 1, wherein said metal oxide comprises boehmite alumina.

4. The process of claim 1, wherein said organic grouping is selected from the group consisting of carboxyl groups, sulfonate groups, phosphonate groups and mixtures thereof.

5. The process of claim 1, wherein R is selected from the group consisting of alkyl groups, cyclic hydrocarbyl groups, alkenyl groups and aryl groups.

6. The process of claim 1, wherein said aging is conducted at a temperature of from 70 to 200° C.

7. The process of claim 6, wherein said aging is conducted for a period of from 0.25 to 8 hours.

8. A process for treating a metal oxide comprising:
   forming an aqueous slurry of a metal oxide, said metal oxide being susceptible to peptization in the presence of an acid;
   mixing with said aqueous slurry an organo silane having the formula $R_y SiX_{4-y}$, wherein R is an organic moiety, X is an organic grouping which produces an acid anion in the presence of water and y is from 1 to 3 and provided that where y is 2 or 3, R can be 2 or 3 of the same organic moiety or 2 or 3 different organic moieties; and
   subjecting the mixture of said aqueous slurry and said organo silane to hydrothermal aging to produce a colloidial metal oxide sol.

9. The process of claim 8, further comprising drying said sol to produce a dispersible powder.

10. The process of claim 8, wherein said metal oxide comprises boehmite alumina.

11. The process of claim 8, wherein said organic grouping is selected from the group consisting of carboxyl groups, sulfonate groups, phosphate groups and mixtures thereof.

12. The process of claim 8, wherein R is selected from the group consisting of alkylgroups, cyclic hydrocarbyl groups, alkenyl groups and aryl groups.

13. The process of claim 11, wherein said aging is conducted at a temperature of from 70 to 200° C.

14. The process of claim 13, wherein said aging is conducted for a period of from 0.25 to 8 hours.

* * * * *